(12) United States Patent
Ohlen et al.

(10) Patent No.: US 9,534,416 B2
(45) Date of Patent: Jan. 3, 2017

(54) METHOD AND DEVICE FOR ERECTING A TOWER FOR A WIND ENERGY PLANT

(75) Inventors: Hermann van Ohlen, Upgant-Schott (DE); Norbert Holscher, Aurich (DE); Michael Honczek, Ihlow (DE); Jan Kapitza, Grossefehn (DE); Ralf Buck, Emden (DE)

(73) Assignee: Wobben Properties GmbH, Aurich (DE)

( * ) Notice: Subject to any disclaimer, the term of this patent is extended or adjusted under 35 U.S.C. 154(b) by 638 days.

(21) Appl. No.: 13/981,713

(22) PCT Filed: Jan. 18, 2012

(86) PCT No.: PCT/EP2012/050729
§ 371 (c)(1),
(2), (4) Date: Oct. 7, 2013

(87) PCT Pub. No.: WO2012/101023
PCT Pub. Date: Aug. 2, 2012

(65) Prior Publication Data
US 2016/0069099 A1    Mar. 10, 2016

(30) Foreign Application Priority Data
Jan. 26, 2011   (DE) .................. 10 2011 003 164

(51) Int. Cl.
*B66C 23/34*    (2006.01)
*E04H 12/34*    (2006.01)
(Continued)

(52) U.S. Cl.
CPC ............. *E04H 12/342* (2013.01); *B66B 9/187* (2013.01); *B66B 19/00* (2013.01); *B66C 1/108* (2013.01);
(Continued)

(58) Field of Classification Search
CPC ........ E04H 12/342; E04H 12/12; B66B 9/187; E04G 21/142; B66C 1/108; F03D 1/001; F03D 11/04; F05D 2230/68
See application file for complete search history.

(56) References Cited

U.S. PATENT DOCUMENTS

| | | | |
|---|---|---|---|
| 3,074,564 A | 1/1963 | Davis et al. | |
| 5,649,782 A | * 7/1997 | Frohlich | ............... B28B 23/005 403/10 |

(Continued)

FOREIGN PATENT DOCUMENTS

| | | |
|---|---|---|
| DE | 8424193 U1 | 12/1985 |
| DE | 100 25 074 A1 | 11/2001 |

(Continued)

OTHER PUBLICATIONS

Fasten It, "Taper pins with external thread, unhardened," XP055268719, retrieved from http://www.fasten.it/en/tech267/pins_-_cotter_pins_-_parallel_keys/dowel_and_taper_pins/taper_pins_with_external_thread_un hardened/ on Apr. 26, 2016, 2 pages.

*Primary Examiner* — Brian Mattei
(74) *Attorney, Agent, or Firm* — Seed IP Law Group LLP

(57) ABSTRACT

The present invention concerns a lifting apparatus, in particular a cross lifting beam, for lifting a first pylon segment of a concrete pylon of a wind power installation by means of a crane, including at least one fixing means for fixing the pylon segment to the lifting apparatus, and at least one release apparatus for releasing a connection between the lifting apparatus and the pylon segment.

8 Claims, 12 Drawing Sheets

(51) Int. Cl.
*B66B 9/187* (2006.01)
*B66B 19/00* (2006.01)
*B66C 1/10* (2006.01)
*F02C 6/18* (2006.01)
*F03D 1/00* (2006.01)
*E04G 21/14* (2006.01)
*E04B 1/04* (2006.01)
*E04G 3/28* (2006.01)
*E04G 5/00* (2006.01)
*E04H 12/12* (2006.01)
*F24H 3/02* (2006.01)
*F16B 35/06* (2006.01)
*F16B 1/00* (2006.01)

(52) U.S. Cl.
CPC . *E04B 1/04* (2013.01); *E04G 3/28* (2013.01); *E04G 5/001* (2013.01); *E04G 21/142* (2013.01); *E04H 12/12* (2013.01); *E04H 12/34* (2013.01); *F02C 6/18* (2013.01); *F03D 1/001* (2013.01); *F03D 13/20* (2016.05); *F24H 3/02* (2013.01); *E04G 2003/286* (2013.01); *F05B 2230/61* (2013.01); *F05D 2220/60* (2013.01); *F05D 2230/68* (2013.01); *F16B 35/06* (2013.01); *F16B 2001/0092* (2013.01); *Y02B 10/30* (2013.01); *Y02E 10/728* (2013.01); *Y02P 70/523* (2015.11)

(56) References Cited

U.S. PATENT DOCUMENTS

| | | | | |
|---|---|---|---|---|
| 6,435,083 B1 * | 8/2002 | Knodler | ............. | B30B 15/0035 100/257 |
| 6,533,533 B1 * | 3/2003 | Heston | ................ | B65G 57/24 414/791.6 |
| 8,596,700 B2 * | 12/2013 | Alba | ...................... | B66C 1/108 294/215 |
| 2002/0095878 A1 | 7/2002 | Hendersen | | |
| 2002/0104287 A1 * | 8/2002 | Sanger | ...................... | B66C 1/12 52/747.1 |
| 2006/0219478 A1 | 10/2006 | Severs et al. | | |
| 2009/0107062 A1 | 4/2009 | Pedersen | | |
| 2009/0284012 A1 | 11/2009 | Mortensen | | |
| 2011/0109106 A1 * | 5/2011 | Inda | ..................... | B66C 1/108 294/215 |
| 2011/0298232 A1 * | 12/2011 | Reger | ...................... | B66C 1/10 294/81.5 |
| 2011/0318159 A1 * | 12/2011 | Krogh | .................... | B66C 1/108 414/800 |
| 2012/0107084 A1 * | 5/2012 | Krogh | .................... | B66C 1/108 414/800 |

FOREIGN PATENT DOCUMENTS

| | | |
|---|---|---|
| DE | 10104351 A1 | 8/2002 |
| DE | 102009061027 A1 | 10/2010 |
| DE | 102009023538 A1 | 12/2010 |
| DE | 202010000868 U1 | 12/2010 |
| EP | 2 108 814 A2 | 10/2009 |
| GB | 1019858 A | 2/1966 |
| JP | 2009-216097 A | 9/2009 |
| KR | 20-1993-0025627 U | 12/1993 |
| KR | 10-2009-0011746 A | 2/2009 |
| SU | 958296 A1 | 9/1982 |
| TW | 41154 | 1/1982 |
| TW | 253924 | 11/1983 |
| TW | 200643278 | 1/1995 |
| TW | 201016961 | 10/1997 |
| TW | M296876 | 9/2006 |
| WO | 2004038108 A1 | 5/2004 |
| WO | 2010147459 A2 | 12/2010 |
| WO | 2011/006526 A1 | 1/2011 |
| WO | 2011050882 A2 | 5/2011 |

* cited by examiner

METHOD AND DEVICE FOR ERECTING A TOWER FOR A WIND ENERGY PLANT

BACKGROUND

Technical Field

The present invention concerns a method of erecting a pylon of a wind power installation. The present invention also concerns a heating apparatus for heating an annularly peripherally extending junction region between a tubular pylon segment with a peripherally extending segment wall and a pylon foundation of a wind power installation when building up the wind power installation. The present invention further concerns a lifting apparatus for lifting a pylon segment of a concrete pylon of a wind power installation by means of a crane, a centering bar for fixing to a first pylon segment of a concrete pylon of a wind power installation and for guiding a second pylon segment of the concrete pylon when the second pylon segment is being lowered onto the first pylon segment. The present invention also concerns a work platform apparatus for working at a variable height in a pylon or pylon segment of a wind power installation. The present invention also concerns a heating apparatus for heating an annularly peripherally extending junction region between a tubular pylon segment with a peripherally extending segment wall and a pylon foundation of a wind power installation when building up the wind power installation. The invention also concerns a method of lifting and lowering a pylon segment of a concrete pylon of a wind power installation.

Description of the Related Art

Methods of erecting a pylon of a wind power installation, in particular a concrete pylon, are basically known. Firstly a concrete foundation is provided. A concrete pylon in the finished condition has a plurality of pylon segments. Such pylon segments can be provided in the form of tubular and thus cylinder-like elements, namely in contrast to a cylinder, with a slightly conical shape. When larger pylon diameters are involved, subdivision in the peripheral direction is also considered, so that for example two elements which are approximately semicircular in cross-section, or other part-circular segments, are fitted together.

Firstly one or more pylon segments are placed on the foundation, as the first lowermost tier of the pylon. It is important that that first tier is very carefully oriented, namely levelled off. For that purpose that first segment or plurality of segments are precisely levelled off and firstly at least provisionally fixed in that levelled position in order then to insert a compensating material between the foundation and the lower pylon segment or lowermost pylon segments, that material finally hardening and fixing that levelled orientation.

A problem in that respect is that hardening of the compensating material requires a certain minimum temperature. At low outside temperatures, such as around freezing point, hardening can be significantly prolonged or can completely fail. That results on the one hand in the risk of a compensating material which has poorly or incompletely hardened. On the other hand, waiting for a prolonged hardening period can result in longer stoppage times for, for example, a crane which is required for the installation procedure. Such a crane which has already lifted the first pylon segment or segments onto the foundation remains unused for the duration of the time for hardening of that compensating material. That therefore involves expensive additional stoppage time for the crane.

In addition the pylon is built up successively by further pylon segments being placed on the pylon portion which has been erected hitherto. The operations required for that purpose thus increasingly take place at an increasing height. Thus, in the region of the uppermost tier of the respectively finished pylon portion, a work platform or scaffold is generally set up, on which workers of the erection team can check placement of a new pylon segment. In that case it is desired in particular to check that the respective new pylon segment is arranged at exactly the correct intended position. Thus by means of a crane, each pylon segment is successively lifted approximately to its intended place and a crane operator performs fine positioning of the pylon segment is question. Accurate positioning of each pylon segment is then effected manually by the workers of the erection team on the above-mentioned work platform, that is to say by human strength. In particular the pylon segment in question usually has to be rotated into the correct position. The erection team holds the pylon segment which is oriented by hand in that way in the correct position and the crane operator then slowly lowers the pylon segment while the erection team ensures that it remains in the oriented position. It is to be taken into consideration in that respect that such a pylon segment can weigh between about 5 and 120 t. Therefore very fine positioning has to be effected in spite of using great physical human strength.

That method of placing a further pylon segment is thus complicated, time-consuming and labor-intensive and has a certain susceptibility to error. In addition there is the risk of injuries for the workers on site, in particular the risk of being crushed.

When the new pylon segment is arranged on the pylon which has been erected hitherto the pylon segment must be separated from a cross lifting beam with which the crane lifted the pylon segment. For that purpose carrier loops like steel cables shaped into loops can be fixed to the pylon segment. The lifting beam is then released from those loops, for example being unhooked therefrom, and the steel cable loops as such are then manually removed from the placed pylon segment by the workers on the work platform. That is also complicated and expensive and requires a quite high labor involvement including a suitable work platform at the height of the pylon which has been finished hitherto.

Quite generally attention is directed to the documents U.S. Pat. No. 3,074,564 A, DE 10 2009 023 538 A1 and DE 20 2010 000 868 U1.

BRIEF SUMMARY

One or more embodiments of the present invention is therefore directed to eliminating or reducing at least one of the above-indicated problems, in particular making the construction of a pylon of a wind power installation more efficient, in particular the construction of a concrete pylon. The invention seeks to provide at least that an alternative solution is proposed.

According to one embodiment of the invention there is proposed a lifting apparatus, in particular a lifting beam, for lifting a pylon segment of a concrete pylon of a wind power installation by means of a crane. Such a lifting apparatus is thus in the form of a carrier structure, in particular a cross lifting beam, which is to lift the pylon segment and which in that case is itself lifted by a crane, in particular therefore being fixed to a crane cable. That lifting apparatus or lifting beam has at least one fixing element or fixing means for fixing to the pylon segment. That can be for example a hook which is intended to engage into a loop of the pylon segment, or a transverse pin between two mounting side portions. In principle there are provided at least two fixing elements, preferably four fixing elements, to be connected at a plurality of locations to the pylon segment in order thereby to be able to stabilize the pylon segment when lifting it. In principle a single fixing element may be sufficient, but a plurality of fixing elements are frequently to be provided to distribute the forces due to weight and to provide for stabilization.

In addition there is provided a release apparatus which can release a connection between the lifting apparatus and the pylon segment. In particular there is to be provided automatic or partly automatic or remotely controlled release or separation of a connection or release of a connection by the release apparatus. Thus that release apparatus can be actuated for example by way of a radio remote control. Actual release however is performed by the release apparatus. Thus workers may not have to perform directly manual work to release the connection where release of the connection is to be effected.

Instead of remotely controlled release of the connection, situation-governed release of the connection is also considered, for example by release of the connection between the lifting apparatus and the pylon segment being performed or started by the pylon segment being set down.

Preferably the lifting apparatus is adapted to release the connection between the lifting apparatus and the pylon segment without any residue in such a way that a further pylon segment can be appropriately arranged on the pylon segment. In other words, after release of the connection, there is no element at the top side of the pylon segment, which would be in the way of placement of a further pylon segment on that top side. Insofar as there is a corresponding recess or other adapted receiving means for the further pylon segment which is to be set in position, an element at the top side of the lower pylon segment in that arrangement can remain. After release of a connection by means of the lifting apparatus, no further manual activities in that respect are necessary on the pylon segment.

By way of example that configuration is intended to prevent a lifting apparatus only releasing the connection to one or more carrier eyes or carrier loops of the pylon segment, that is to say becoming unhooked, while however the remaining carrier eyes or carrier loops still have to be manually removed.

That embodiment can in that respect also involve the situation where, upon release of the connection between the lifting apparatus and the pylon segment, an auxiliary means such as a carrier eye or carrier loop or the like is also released from the pylon segment. That auxiliary means which is released from the pylon segment does not have to be part of the lifting apparatus.

It is desirable if the lifting apparatus, in particular the release apparatus, is adapted to release, in particular unscrew, a connecting element, in particular an eye or steel cable loop which is screwed into the pylon segment, from the pylon segment. That structure is based on the use of a connecting element or a plurality of connecting elements which are fixed to the pylon segment to be lifted, in particular being screwed thereinto. The basis for that structure is thus a connecting element like an eye, a steel cable loop, a ring or the like which in addition has a threaded portion in order to be screwed into a threaded opening, in particular a threaded blind hole. The lifting apparatus can engage by means of a hook or other engagement element into the opening in the eye, loop, ring or the like to lift the pylon segment. If, after definitive placement of the pylon segment, the lifting apparatus were only released from that connecting element, the connecting element would remain and would prevent the placement of a further pylon segment on that pylon segment. In accordance with this embodiment therefore the release apparatus is so adapted that it can also release the connecting element from the pylon segment. For the preferred example of screwed-in connecting elements, they are unscrewed from the pylon segment. That can be effected by means of a motor, in particular an electric motor, for the lifting apparatus or for each individual release apparatus. The motor thus performs a rotary movement of the engagement means which engages into the connecting element and that rotary movement is transmitted to the connecting element and thereby screws the connecting element out of the pylon segment. All that remains behind is an opening in the pylon segment, which however does not present an obstacle to placement of a further pylon segment thereon.

In principle it is also possible to provide other connections between the connecting element and the pylon segment, which include a releasable connection, such as for example an arresting apparatus.

Preferably each fixing element is adapted to be connected to a respective one of the steel loops or other connecting element, wherein each fixing means is provided with one of the release apparatuses in order to screw the steel loop connected to the respective fixing means, or other connecting element, out of the pylon segment. Correspondingly, each fixing means can individually unscrew the connecting element connected thereto, out of the pylon segment. That provides for decoupling of the individual release apparatuses and release procedures. Simple and appropriate division is possible in particular when using electric motors.

Preferably there are provided at least two fixing means which can each be releasably connected to a steel cable loop. For that purpose in particular there can be provided a load-bearing transverse pin for insertion into a steel cable loop or a hook portion for hooking engagement into a steel cable loop, which are preferably respectively secured by a safety means to prevent unintended release of the connecting element from the fixing means. In that respect the underlying idea is also that, after release of the connecting elements from the pylon segment, they still have to be moved by means of the lifting apparatus to the ground on the building site at the erection location and in that respect also are not to be allowed to drop down. When the lifting apparatus including those connecting elements has been lowered to the ground then the connecting elements can there be removed from the fixing means.

Preferably all or some of the fixing means and preferably including the release apparatus can be altered in their position on the lifting apparatus to be adapted to different sizes of pylon segments to be lifted. In that way the apparatus expenditure involved in erecting a wind power installation pylon can be kept down in that respect, although the pylon segments change in respect of size and/or nature, with the increasing height of the upwardly tapering wind power installation pylon.

In addition there is also proposed a centering bar. Such a centering bar is provided for fixing to a first pylon segment of a concrete pylon of a wind power installation and for guiding a second pylon segment of the concrete pylon when the second pylon segment is being lowered onto the first pylon segment. For that purpose the centering bar has a fixing portion for fixing to the first pylon segment, and a guide portion for guiding the second pylon segment. The centering bar is therefore fixed to the first and thus lower pylon segment. The guide portion is suitably adapted to guide the second and thus upper pylon segment in the lowering movement. A wind power installation pylon in the finished condition has a plurality of pylon segments which in particular are placed one upon the other. To obtain overall a vertical stable pylon, all segments have to be placed tidily and accurately upon each other. The proposed centering bar makes a contribution to that, and provides that the second pylon segment is placed as precisely as possible on the first one, that is to say the upper pylon segment is placed precisely on the lower one.

Preferably the centering bar has at least one of the following features or properties. Preferably the fixing portion of the centering bar is provided with a male thread, in particular a metal thread, for screwing into the first pylon segment. Thus on the pylon segment, there is to be provided a corresponding thread for screwing in the centering bar, which advantageously corresponds in nature and size to an above-described thread or blind hole with thread for receiving a carrier loop or other carrier means, and in particular is identical thereto. The centering bar can then be screwed into the thread at the top side of the first pylon segment and thus fixed in place. When using a corresponding thread that also provides for accurate positioning of the centering bar in the first pylon segment.

Preferably the guide portion is conical and tapers at the side away from the fixing portion. When therefore the centering bar is appropriately fitted into the first pylon segment at the top thereof, in particular being screwed therein, the guide portion tapers upwardly. The guide portion can thus correspond for example to a cone portion.

The guide portion can preferably be made from plastic. That makes it possible for the centering bar to be of a simple design configuration and in particular the shape thereof can be easily produced and reproduced. In particular the guide portion of the centering bar is provided for engaging into a corresponding opening at the underside of the second, that is to say upper, pylon segment.

It is desirable if the fixing portion and the guide portion are formed concentrically about a common axis. That permits simple manufacture, space-saving storage and transport. In particular however that simplifies handling and ensures handling properties which are as good as possible, and in particular properties for guidance of the upper pylon segment when it is being lowered.

In addition there is proposed a pair of centering bars comprising two centering bars of differing sizes. In that respect in particular the fixing portions, that is to say in particular a fixing portion with thread, can be of the same size whereas the guide portions are of a differing sizes. When those two centering bars, that is to say the pair thereof, are arranged at the top side of the first pylon segment, that is to say the lower one, those two centering bars thus project to different heights above the top side of that first pylon segment. For orientation of a second pylon segment which is to be placed on the first one, the second pylon segment is firstly conveyed by means of a crane into a hanging position approximately above the first pylon segment. The second pylon segment can now be slowly lowered so that a centering sleeve in the second pylon segment is disposed with a downwardly facing opening above the larger centering bar and is lowered to such an extent that that larger centering bar extends partly into the corresponding centering sleeve. In that case the second pylon segment is lowered only to such an extent that the smaller centering bar, that is to say the centering bar with the shorter guide portion, is still free. The underside of the second pylon segment is therefore still just above the uppermost tip of that smaller centering bar. Partial engagement of the larger centering bar into its corresponding centering sleeve means that the second pylon segment can now be pivoted in precisely that region around the large centering bar until a further centering sleeve is disposed above the smaller centering bar. The second pylon segment can now be further lowered so that the smaller centering bar also engages into its corresponding sleeve. Now at least two centering bars are each respectively partially introduced into a centering sleeve, namely at least the above-described larger centering bar and the above-described smaller centering bar. That second pylon segment can now be further lowered and as that happens the preferably conical centering bars implement correct positioning of the pylon segment.

According to another embodiment of the invention therefore there is also proposed a centering sleeve for being concreted into a second pylon segment of a concrete pylon of a wind power installation in accordance with claim 10. As described above such a centering sleeve is used to guide the second pylon segment when it is being lowered onto a first pylon segment and in that case is intended to co-operate with a described centering bar. Such a centering sleeve has at least one cavity with an internal contour for receiving a conical centering bar and an opening for the introduction of such a conical centering bar. The cavity and the opening are in that case in particular of such a configuration, that is to say both in respect of shape and dimensions, that they can co-operate with a corresponding centering bar. In other words the corresponding centering bar should be adapted in as accurately fitting relationship as possible to the centering sleeve, that is to say the cavity therein, so that it is guided into position upon being introduced.

The centering sleeve has an external contour for holding the centering sleeve in the concrete of the pylon segment. In that respect it is advantageous if the external contour has for example a projection such as for example a peripherally extending projection to prevent the centering sleeve from falling out of the hardened concrete. Depending on the respective boundary conditions such as roughness of the material of the centering sleeve and possibly further holding means, it may be sufficient if the external contour substantially corresponds to the internal contour of the cavity.

Preferably the centering sleeve is made substantially from plastic. The essential aspect is that plastic is used as material for the centering sleeve, but possibly also holding elements such as a holding hook or the like can be added for example made of metal or another material. In particular the configuration of the cavity can be afforded in a simple fashion by means of a plastic material, for example using an injection molding process.

Preferably moreover a positioning portion is provided on the centering sleeve, which is adapted to position and/or fix the centering sleeve in a concrete mold or on a support surface of a concrete mold, that is used in that respect. That positioning portion provides that the centering sleeve is centered as exactly as possible and the concrete segment is then cast. In that respect it is necessary to ensure that casting of the concrete into the corresponding segment mold loads the centering sleeve or sleeves in respect of position and also orientation and does not shift it or them or move it or them in some other way. The centering sleeve is then suitably cast into the pylon segment. In that case the opening should not be closed, or such a closure should be so immaterial that it can be easily removed again after the concrete has set. In that way a pylon segment with at least one centering sleeve which is easily incorporated therein and thus a clearly defined centering opening which can co-operate with a centering bar is correspondingly produced in a simple fashion.

Such a pylon segment of a concrete pylon with a centering sleeve concreted therein is accordingly also proposed.

It is thus advantageous to provide a centering set comprising at least one centering bar and a centering sleeve adapted thereto.

According to another embodiment of the invention there is also proposed a work platform apparatus for working at varying heights in a pylon or pylon portion of a wind power installation. That work platform apparatus is provided for building a pylon and in that respect for use in a partially finished pylon which can also be referred to as a pylon portion. The work platform apparatus includes a work basket or cage for accommodating a person for working in the pylon at varying heights. The work cage is adapted in that respect to be provided in particular in the respective region of the uppermost pylon portion which is arranged at that time. In that respect the basic starting point adopted here is a pylon of a wind power installation which is of a segment-wise composition, that is to say therefore which is produced by superposed arrangement of pylon segments. They can preferably be segments of a concrete pylon, that is to say concrete segments. Use in a steel pylon can nonetheless also be considered.

The work platform apparatus also has a fixing portion for accident-proofing fixing the work cage to a pylon ladder provided with a safety rail. The fixing portion therefore has to be adapted not only to fix the work cage virtually as desired to the pylon ladder, but it must be adapted in such a way that, having regard to accident prevention regulations, at least one worker can and may safely work therein at the respective height in the pylon. The pylon ladder to which that safety cage is to be fixed in accident-proof fashion has a safety rail in which a worker in the pylon can secure his safety harness in the appropriate fashion in accordance with regulations. The fixing portion of the work cage is adapted thereto.

In an embodiment the work cage has a floor portion and the floor portion can be so opened that this gives a floor opening through which an adult, namely a person of a construction team of the wind power installation pylon, can leave the work cage in a downward direction. Accordingly the work cage can be opened downwardly and the member of the construction team can leave the work cage downwardly, in particular by way of the pylon ladder to which the work cage is fixed.

Preferably the floor opening is such that, when leaving the work cage through the floor opening when the work cage is fixed to the pylon ladder, the person can remain constantly secured to the safety rail with a safety harness by way of a safety slider and in particular the person can guide the safety slider in the rail when leaving the work cage. In other words, when opening the floor opening, the safety rail is completely exposed in that respect. The person who wants to leave the work cage in a downward direction can thus already secure himself in the cage by means of the safety harness and the corresponding safety slider on the safety rail, which in any case is to be provided for the entire stay in the work cage. The opening can then be opened, in which case the person remains uninterruptedly secured. Finally the person on the pylon ladder can simply climb down out of the work cage along the ladder. In that respect the safety slider is guided in otherwise known fashion in the safety rail and at no point does that involve a situation in which the person is not secured. The person is secured throughout during the entire procedure.

In a further embodiment it is proposed that the work platform apparatus is provided with a lifting means. That lifting means is provided for fixing to the pylon ladder and for upwardly pulling the work cage along the pylon ladder provided with the safety rail, from a first working position into a higher second working position.

Preferably the lifting means has a block and tackle arrangement or at least a deflection means for deflecting a carrier cable, wherein the block and tackle arrangement or deflection means is adapted for fixing to the pylon ladder or the safety rail. In that way it is possible for the block and tackle arrangement or the deflection means to be fixed above the work cage to the same pylon ladder or the safety rail connected thereto. An end of a carrier cable or an end of the block and tackle arrangement is then fixed to one or more suitable locations of the work cage and the other end of the cable extends to the person who is intended to actuate the lifting means. In that case that person can have previously left the work cage in a downward direction through a corresponding opening and can be standing beneath the work cage. The cable can extend through that opening in the floor of the work cage to the person. That person can now pull the work cage upwardly into a higher working position, using the cable. That is particularly advantageous when constructing a wind power installation pylon comprising individual pylon segments, by the work cage being respectively successively moved in the above-described manner into the region of the upper pylon segment, in particular into the proximity of the upper edge of the uppermost pylon segment, because working operations are to be performed there, when the next pylon segment is to be set in place there. Preferably that involves using pylon segments with pre-assembled pylon ladder portions.

According to another embodiment of the invention there is also proposed a heating apparatus for heating an annularly peripherally extending junction region between a tubular pylon segment with a peripherally extending segment wall and a pylon foundation of a wind power installation when constructing the wind power installation in accordance with claim 19. That heating apparatus has one or more cover tarpaulins for covering the junction region. In addition it has one or more annular carrier frameworks for carrying the or one of the covering tarpaulins. In that respect the one or more carrier frameworks is such that there is sufficient space for at least one adult between the junction region and the cover tarpaulins which are placed on the carrier framework.

That heating apparatus is based on the realization that, to orient a pylon segment on a pylon foundation, it is possible to use a compensating material which hardens poorly, slowly or not at all, in particular at frosty temperatures, that is to say in particular temperatures around and in particular below freezing point. Erecting pylons of wind power installations in cold regions and/or at cold times of the year therefore causes problems, and can lead at least to delays in erecting the wind power installation pylon. Having regard to the fact that a suitable crane is already necessary for setting up the first pylon segment, a delay in construction already signifies an idle time of the crane booked for that operation, with the costs that this involves. The use of the heating apparatus is therefore intended to provide that, in spite of low ambient temperatures, the temperature in the region in which levelling is effected by means of the compensating material, is increased at least to such an extent that hardening of the compensating material is not adversely affected or not substantially so.

The heating apparatus proposed for that purpose essentially provides for arranging a heat cover means around the specified region to be heated. For that purpose, there is proposed a holding apparatus which is leant against or fixed to the pylon and on which a suitable cover tarpaulin is arranged. Use of the carrier framework or frameworks means that the cover means can basically be kept away from the location to be heated to such an extent that there is sufficient space for one or more people to work. For that purpose the carrier frameworks are of an annular configuration. That expression of annular configuration embraces not just an annular shape in the mathematical sense of a circle, but also polygonal constructions which are adapted to the round shape of a wind power installation pylon or pylon segment.

Preferably there is provided an inner partial cover apparatus for arrangement in the interior of the pylon segment, which includes an in particular independent structure comprising a carrier framework or frameworks and a cover tarpaulin or tarpaulins. In addition or alternatively an outer partial cover means is provided for arrangement externally around the pylon segment which in turn has at least one cover tarpaulin and a carrier framework. Thus it may possibly be sufficient to manage only with an outer partial cover apparatus if the outside temperature is not too low and the protected position of the space in the first pylon segment can guarantee a sufficiently high temperature there.

Preferably the at least one carrier framework has an annularly peripherally extending upper carrier portion for fixing to the pylon segment. Taking that as the basic starting point, the carrier framework can then be further constructed and in particular it is possible to fit hold-off struts for holding the cover tarpaulins away.

A cover tarpaulin can comprise a water-tight material in order at the same time also to afford protection from rain. On the other hand a cover tarpaulin is not restricted thereto, but air-permeable and/or water-permeable materials can also be considered. It is possible to provide a high insulating property for those tarpaulins. Depending on the respective outside temperature a thin tarpaulin may suffice, which prevents or at least minimizes substantially circulation of air and in particular the escape of warm air by convection.

Preferably there is provided a heating means, in particular a fan heater. That heats the air in the space between the junction region and the tarpaulin and the tarpaulin substantially prevents the air heated in that way from escaping. It is to be repeated that heating to temperatures just above the freezing point can often be sufficient to permit the compensating material to harden.

Preferably the tarpaulin has a light-absorbent surface. In that way sunlight can additionally be used for heating. Depending on the outside temperature and solar radiation such heating may be sufficient or a heating means such as for example a fan heater is additionally employed.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Figure 1:
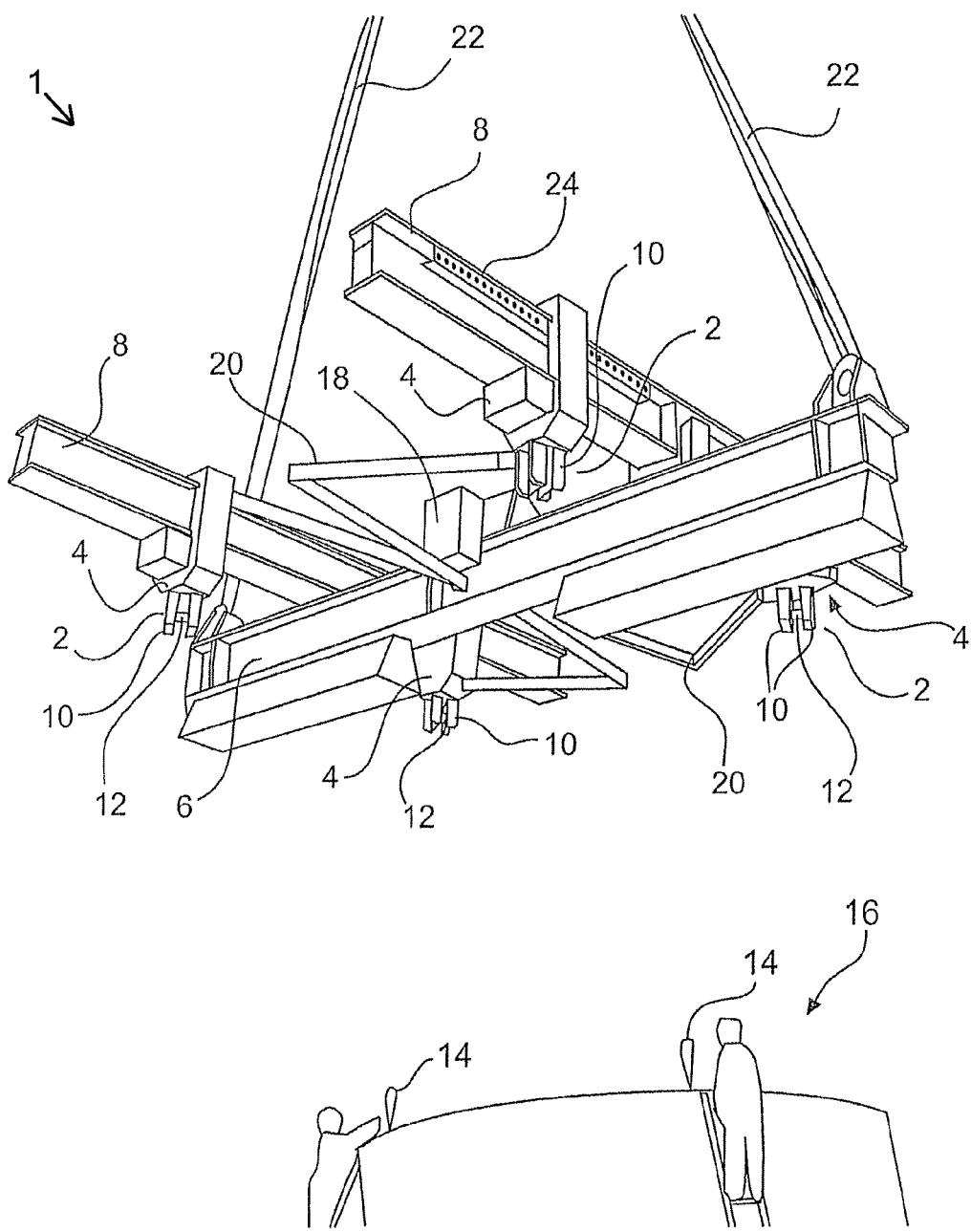
FIG. 1 shows a perspective view from below of a lifting apparatus.

FIG. 1 shows a lifting apparatus 1 having four fixing means 2 for fixing a pylon segment to the lifting apparatus 1. A release apparatus 4 is associated with each fixing means 2. The fixing means 2 may be any fixing element, including a hook or a transverse pin between two mounting side portions. The release apparatus 4 is here in the form of an apparatus for rotating the respective fixing means 2 about a respective axis of rotation which is substantially appropriately perpendicular. The lifting apparatus 1 has a central carrier 6 and two transverse carriers 8 fixed to the central carrier 6. The transverse carriers 8 are fixed variably in position to the central carrier 6. The transverse carrier 8 also carries the release apparatuses 4 with their fixing means 2, wherein the release apparatuses 4 are in turn arranged movably, namely slidably, on the respective transverse carrier 8. In that way the lifting apparatus 1 can be adapted to different pylon segment sizes.

Each fixing means 2 has two holding arms 10 with a respective carrier pin 12. A carrier loop 14 of a pylon segment 16 is to be appropriately received between the two holding arms 10 of a fixing means 2 so that the carrier pin 12 passes through the carrier loop 14 and carries it thereby.

Each release apparatus 4 includes an electric motor adapted to rotate fixing means about a substantially perpendicular axis in order thereby also to rotate a carrier loop 14 received between the holding arms 10 in order thereby to provide that the respective carrier loop 14 is screwed out of the pylon segment 16.

To control the release apparatuses 4 there is provided a release control means 18 connected by way of connecting arms 20 to the respective release apparatuses 4 to actuate same.

The lifting apparatus 1 is lifted by a crane on carrier cables 22. The respective release apparatus 4 serves at the same time for holding the fixing means 2 in question and the release apparatus 4 can be arrested by means of a respective arresting rail 24 on the respective transverse carrier 8 in predetermined positions which are adapted to the size of the respective shaped segment 16 to be lifted.

Figure 2:
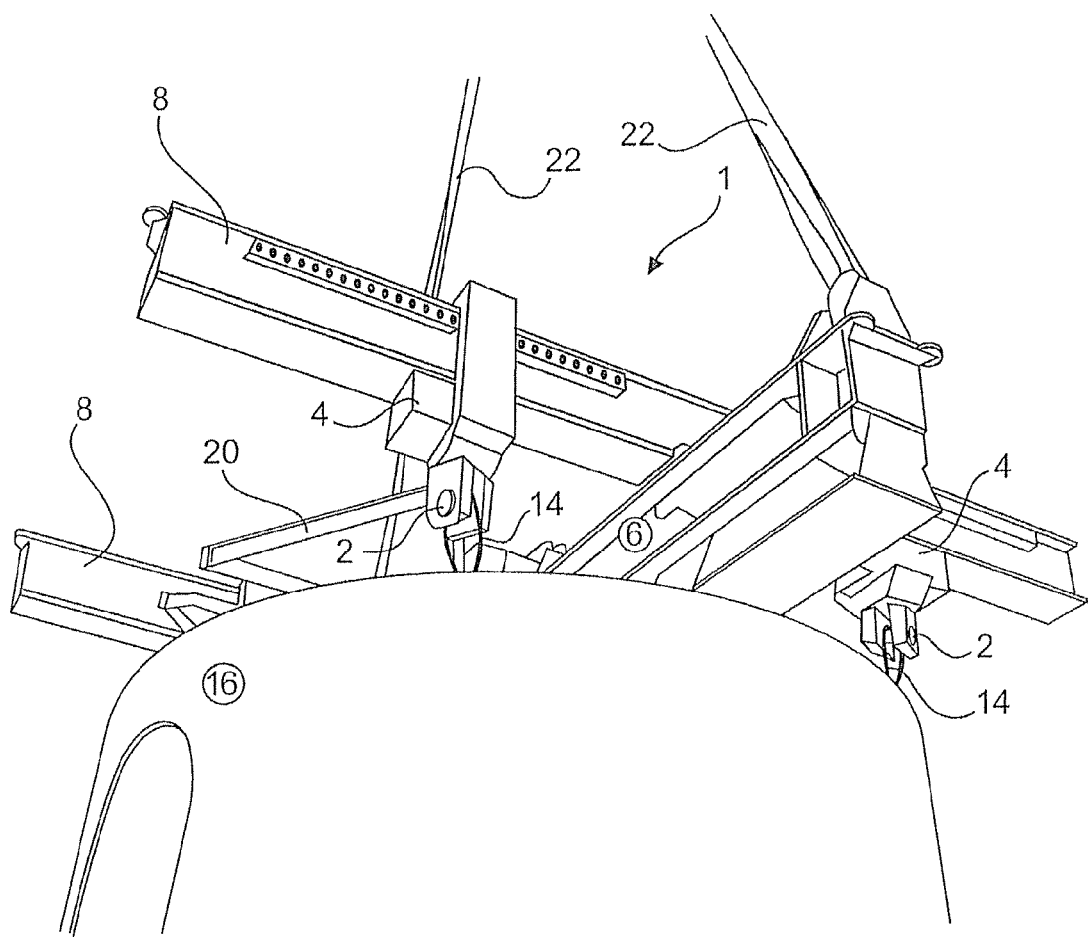
FIG. 2 shows the lifting apparatus of FIG. 1 in a condition of being fixed to a pylon segment.

FIG. 2 shows the lifting apparatus 1 in a condition of being connected to the pylon segment 16, the connection being made by the fixing means 2 by way of four carrier loops 14, of which only two are to be seen by way of indication in FIG. 2. The carrier loops 14 are screwed into the pylon segment 16 from above, in an upper attachment surface. After the pylon segment 16 has been set down at its appropriate position—in the present example on the foundation—and the lifting apparatus 1 has been lowered to such an extent that the carrier loops 14 no longer carry any significant tensile stress, and are therefore substantially unloaded, the respective release apparatus 4 rotates the fixing means 2 in order thereby to rotate the corresponding carrier loop 14 and thereby to decouple or unscrew it from the pylon segment.

Figure 3:
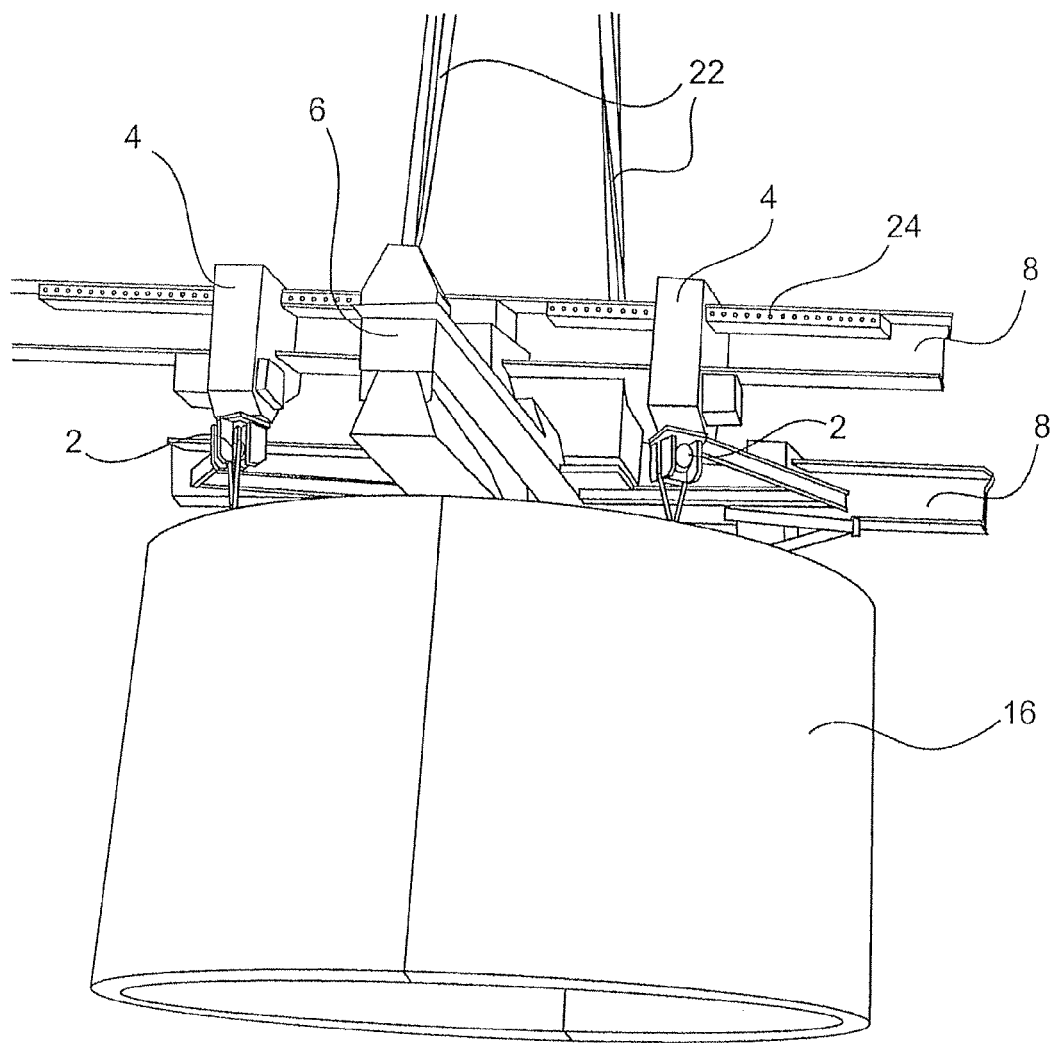
FIG. 3 shows a perspective view of a pylon segment lifted by means of a lifting apparatus, together with the lifting apparatus.

FIG. 3 shows the lifting apparatus 1 with a pylon segment 16 fixed thereto in a hanging condition and as an overall perspective view.

Figure 4:
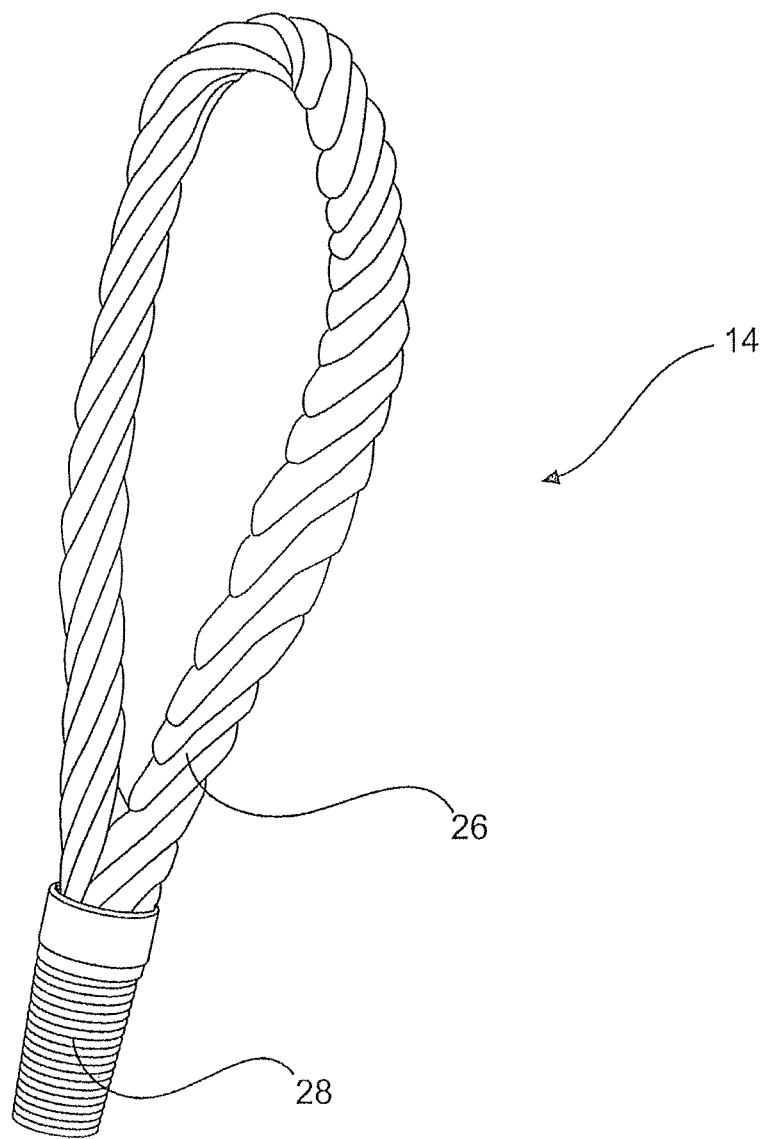
FIG. 4 shows a perspective view of a carrier loop.

The carrier loop 14 which is shown more precisely in FIG. 4 has a loop portion 26 and a thread portion 28. The thread portion 28 is adapted for being screwed into a corresponding counterpart thread in the pylon segment 16. A pylon segment 16 can thus be adapted for being lifted with a lifting apparatus 1 as indicated in FIG. 1. For that purpose the carrier loops 14 are screwed into the pylon segment 16 and project upwardly. To carry the pylon segment the carrier loops 14 are connected to the corresponding fixing means 2 and can be lifted, as indicated in FIG. 3. After having been set down however the fixing means is not released from the carrier loop 14 but the fixing means 2 is rotated by the release apparatus 4 whereby the carrier loops 14 are also rotated and as a result can be released from the pylon segment 16. The pylon segment 16 thus remains at its appropriate placement location, wherein the carrier loops 14 are already removed and the next pylon segment can be set down on the pylon segment which was last put in position.

Figure 5:
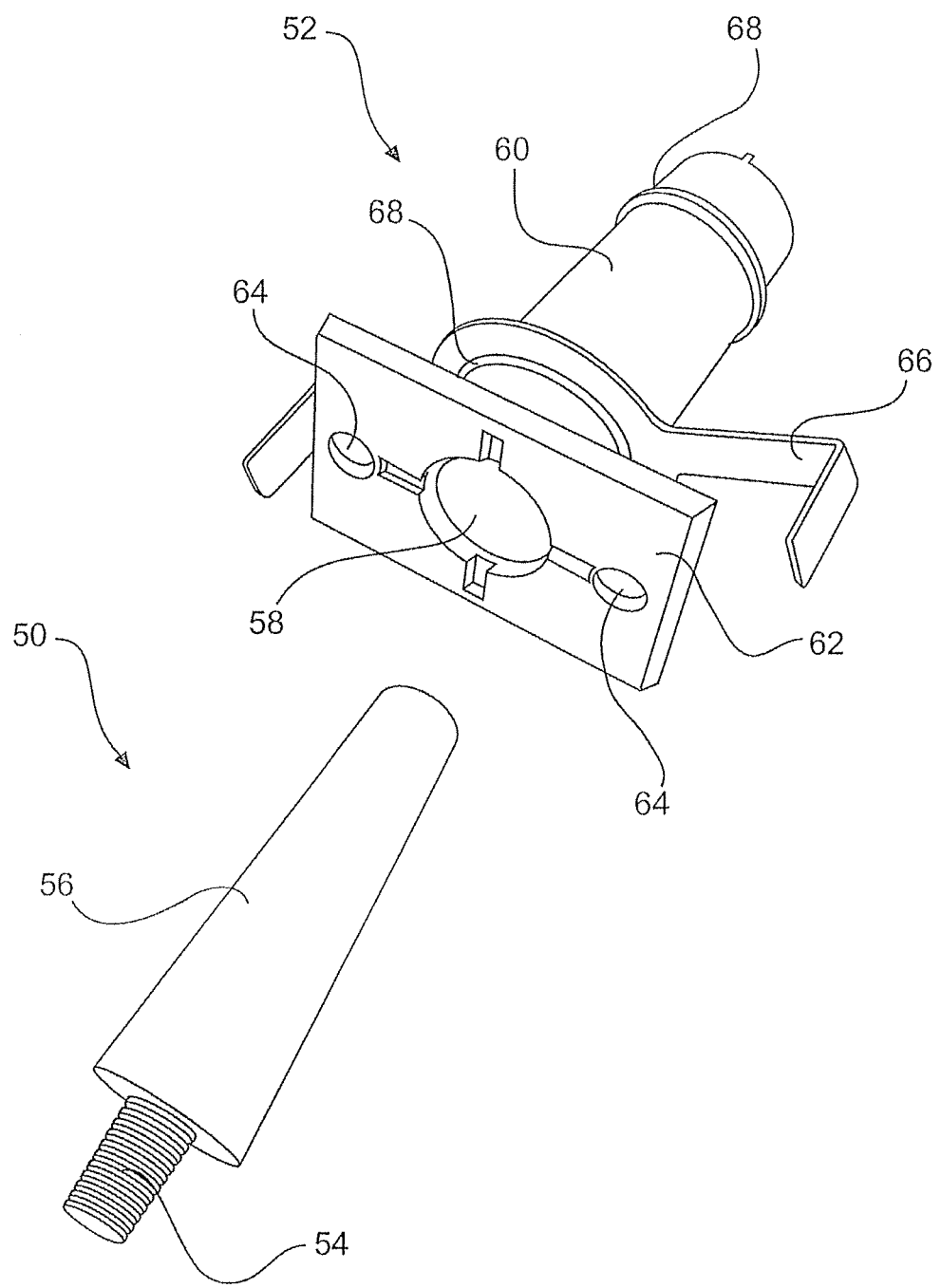
FIG. 5 shows a perspective view of a centering bar and a centering sleeve.

FIG. 5 shows a centering bar 50 and a centering sleeve 52. The centering bar 50 has a fixing portion 54 and a guide portion 56. The fixing portion 54 is substantially in the form of a threaded pin and carries the guide portion 56 which is conical and tapers from a side facing towards the fixing portion 54. The guide portion 56 in that case is of an approximately conical shape.

The centering sleeve 52 has an opening 58 through which the guide portion 56 of the centering bar 50 can be introduced into a cavity in the centering sleeve 52. Of the centering sleeve 52, FIG. 5 also substantially shows an external contour 60 which basically also indicates the shape of an internal contour of the cavity.

The centering sleeve 52 is provided for being concreted into a pylon segment of concrete in the production thereof so that essentially the opening 58 and also the positioning plate 62 are still accessible at a lower junction surface of the pylon segment. The positioning plate 62 has two positioning openings 64 for being concreted into the segment. Before the concreting operation the centering sleeve 52 is placed with the positioning plate 62 facing downwardly on a flat surface on which a mold for casting the pylon segment is also arranged. Provided on that flat surface or plate, for each centering sleeve 52, are two respective centering noses which respectively engage into the positioning openings 64 and thus exactly position the centering sleeve 52. In that case the positioning plate 62 provides that the centering sleeve 52 is oriented perpendicularly as accurately as possible, in particular in relation to the external contour 60 which accommodates the cavity.

For holding the centering sleeve 52 in the concrete, there is a holding plate 66 which can also be referred to as a holding stirrup and which in particular holds the centering sleeve in position when casting the concrete. In addition the peripherally extending rounded outside arms 68 assist with affording a firm hold in the concrete.

Figure 6:
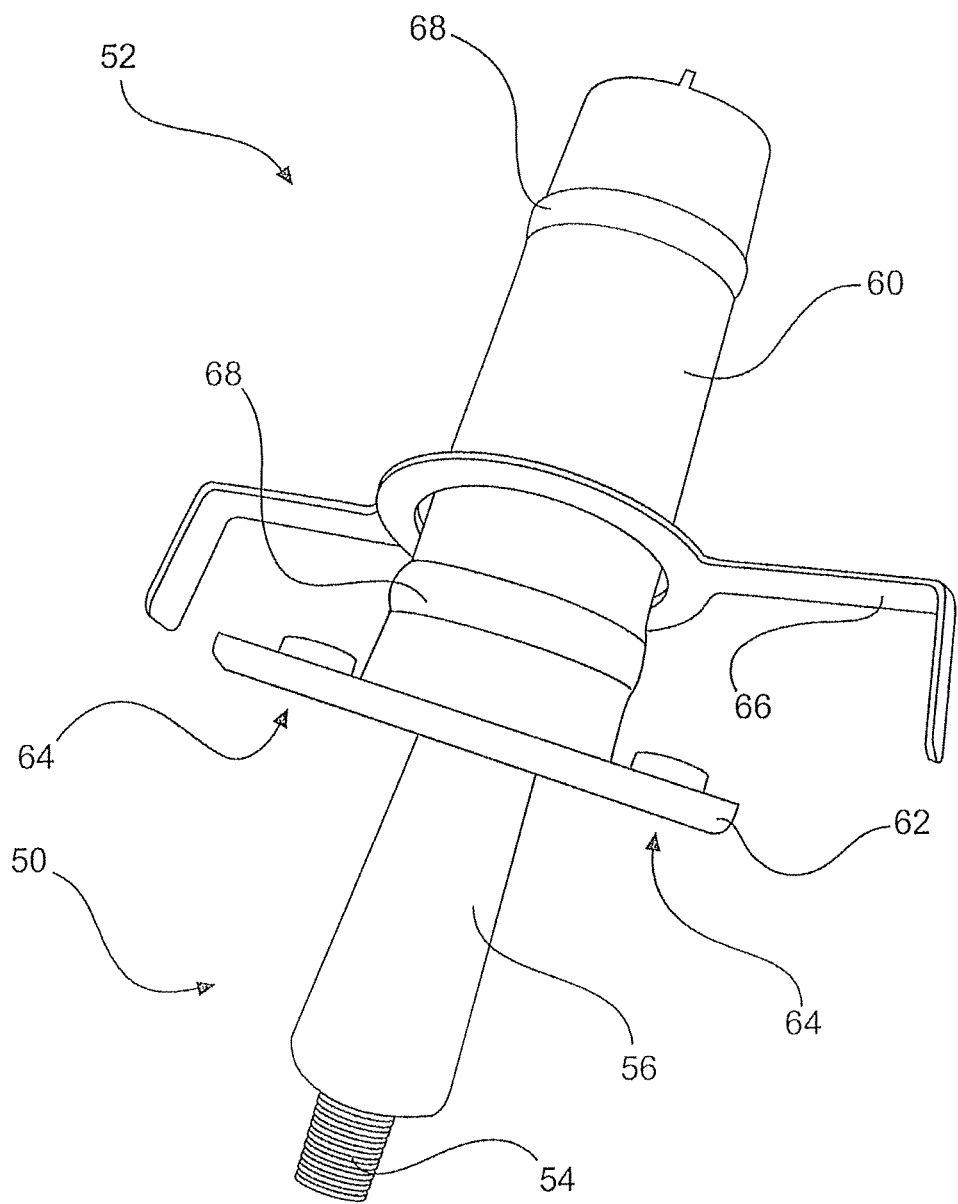
FIG. 6 shows a partly assembled condition of the centering bar and the centering sleeve of FIG. 5.

FIG. 6 shows the centering bar 50 in a condition of being partially inserted into the centering sleeve 52, for illustration purposes. In use the centering bar 50, namely the guide portion 56, is introduced into the centering sleeve only when two pylon segments are placed one upon the other, the centering sleeve 52 in that case already being concreted into one of the two pylon segments.

Figure 7:
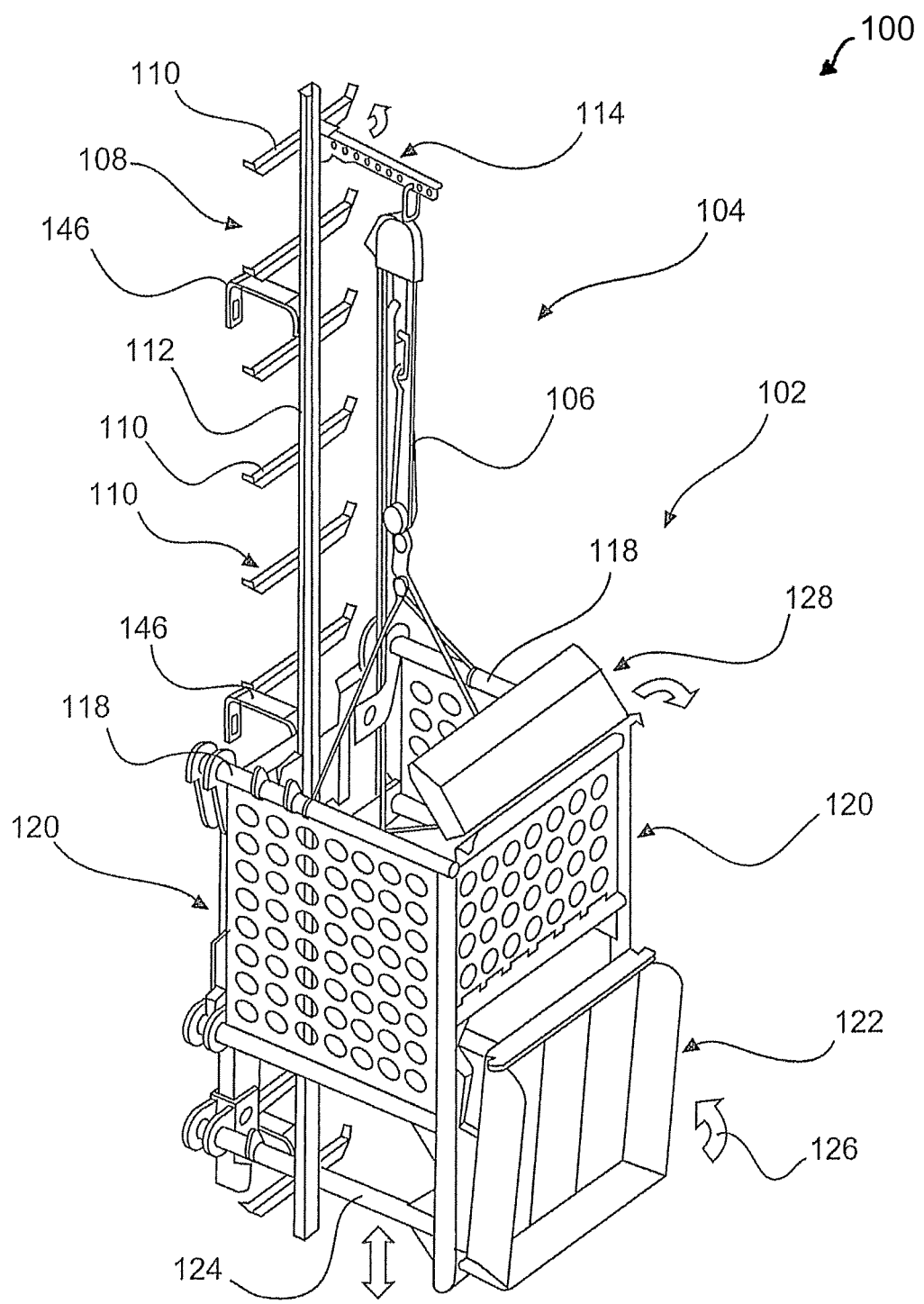
FIG. 7 shows a perspective view of a work platform apparatus.

The work platform apparatus 100 in FIG. 7 includes a work cage 102 and a lifting device 104 having a block and tackle arrangement 106. The work platform apparatus 100 is in this case fixed to a pylon ladder 108 provided with ladder rungs 110 and a safety rail 112. For that purpose the lifting device 104 has a load arm 114 which is non-displaceably tarpaulins fixed to the safety rail 112 by means of a fixing portion 116. The block and tackle arrangement 106 is fixed to the load arm 114 and in addition it is fixed to the work cage 102 which can thus be pulled into a higher position by means of the block and tackle arrangement.

The work cage 102 is also non-displaceably fixed in a working position to the pylon ladder 108. The block and tackle arrangement 106 or the lifting device 104 overall is intended to hold and lift the work cage 102 only upon movement thereof into a higher position. Accordingly the lifting device 104 is intended to also hold and lift the work cage 102 substantially only in the unloaded condition, that is to say without working personnel.

The work cage 102 has a rail 118 with various attachment points for fixing the block and tackle arrangement 106 for lifting the work cage 102. The rail 118 is otherwise provided to prevent a person from falling out of the work cage 102. That is assisted by some protective walls 120.

The work cage 102 also has a pivotable platform 122 which serves as the floor or floor portion of the work cage 102. In FIG. 7 the platform 122 is shown in a position of being pivoted to the side, in which a person can leave the work cage 102 in a downward direction. For that purpose the platform 122 in the position of being pivoted away exposes a suitable floor opening 124. The direction of pivotal movement of the platform is indicated by the arrow 126. In addition there is a pivotable toolbox 128 which can be pivoted into or out of the work cage 102 as required. It may possibly be appropriate for reasons of space, when changing the position of the work cage 102 by means of the lifting device 104, to pivot the toolbox 128 into the work cage 102. While working operations are carried out in the work cage 102 or from the work cage 102, the toolbox 128 can be pivoted into a position outside the work cage 102 to give additional space in the work cage 102.

Figure 8:
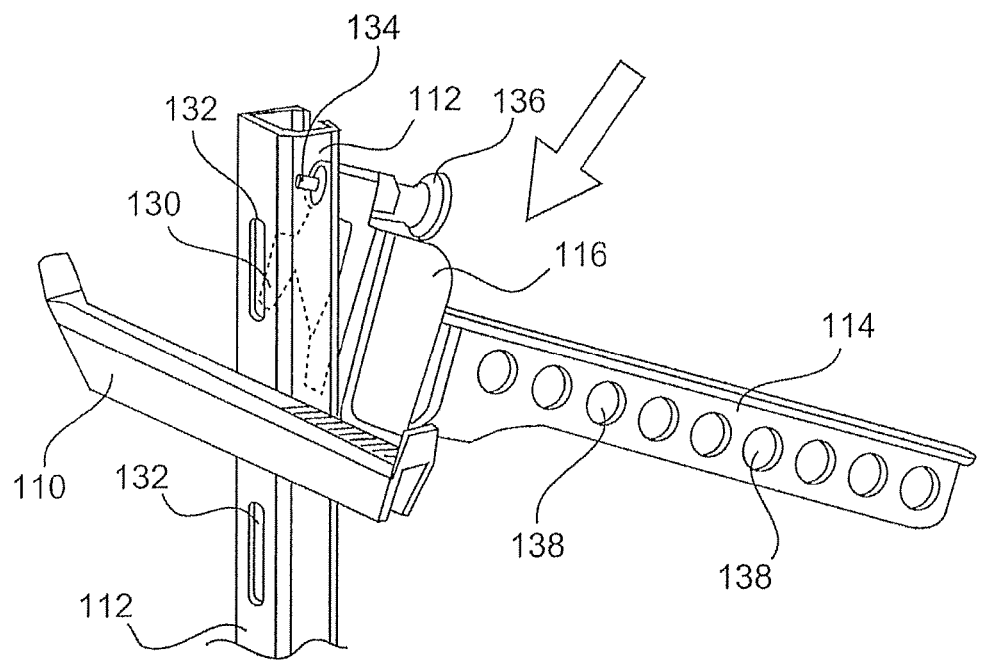
FIG. 8 shows a fixing element of the work platform apparatus of FIG. 7 prior to and after connection to a safety rail.

FIG. 8 shows the fixing of the load arm 114 to the safety rail 112. In this case the load arm 114 is fixed to the safety rail 112 by means of the fixing portion 116. For that purpose the fixing portion 116 has a fixing hook 130 which is intended to engage into an elongate opening 132 which can also be referred to as a slot and which is arranged at the rear side of the safety rail 112. For fixing purposes the load arm 114 is introduced with its fixing portion 116 and the fixing hook 130 in a slightly inclined position into the safety rail 112 which is in the form of a C-shaped profile member, and is pushed somewhat downwardly into its fixed position. To prevent it from coming loose again there is provided a latching pin 134 which in the fixed position engages into the same slot 132 as the fixing hook 130. The completely inserted position is shown as a side view in FIG. 9.

Figure 9:
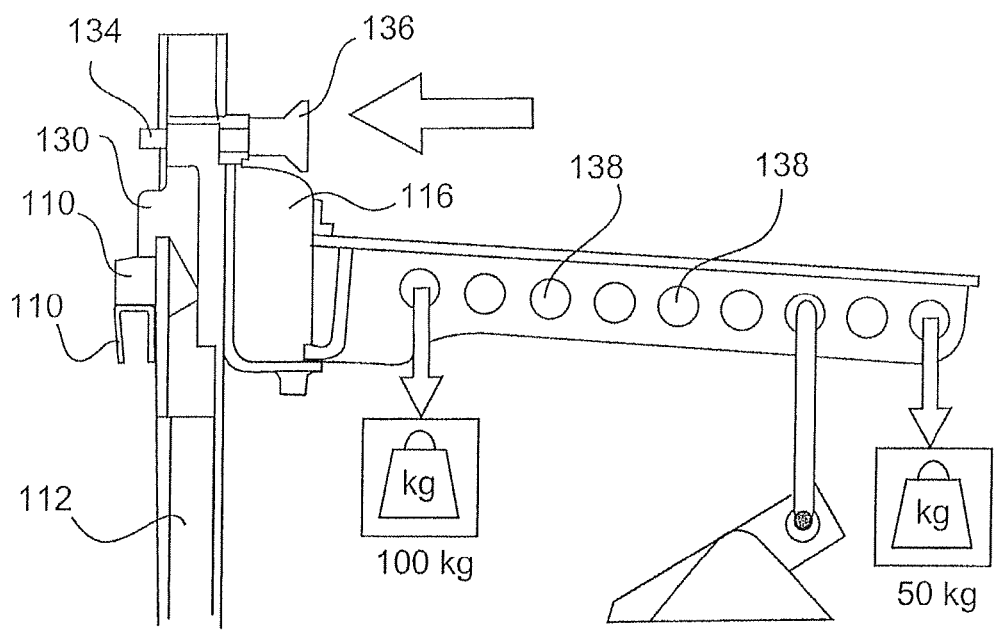
FIG. 9 shows the connecting element of FIG. 8 in a condition of being connected to the safety rail.

To release the load arm 114 from the safety rail 112 again the latching pin 134 would have to be manually released by pulling on its actuating head 136. FIG. 9 also shows that the load arm 114 has a plurality of fixing bores 138 providing various fixing positions for the block and tackle arrangement 106 of the lifting device 104. Different fixing bores 138 can receive different weights. In addition an advantageous pulling direction when lifting the work cage 102 can be selected by a clever selection of the fixing bore 138.

Figure 10:
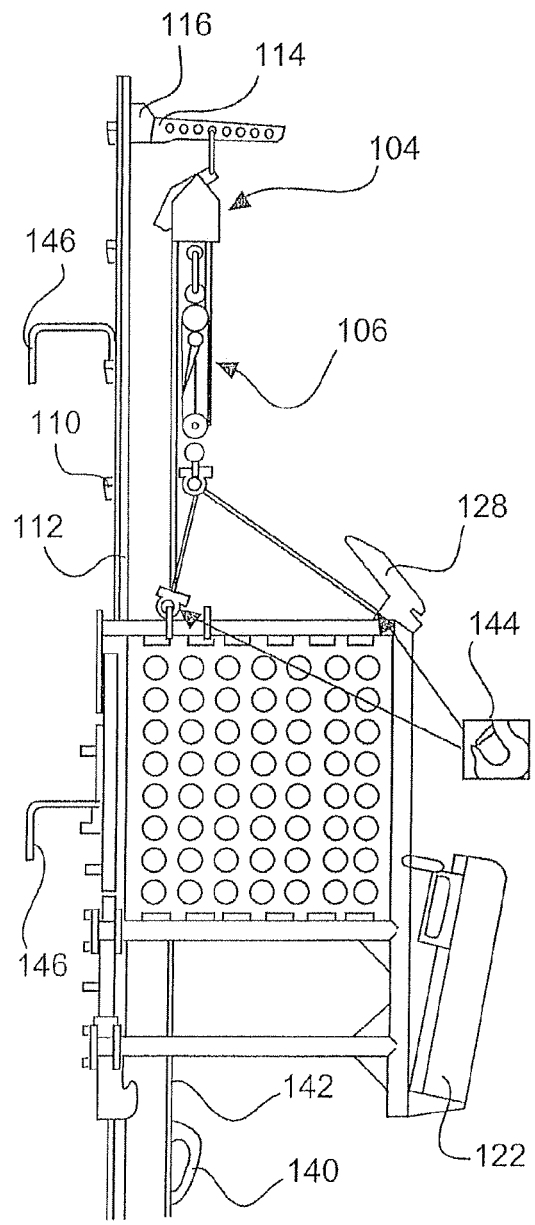
FIG. 10 shows a side view of a work platform apparatus.

FIG. 10 basically shows a side view of the situation in FIG. 7. It will also be seen in this case that an actuating portion 140 is fixed to a cable 142 of the block and tackle arrangement 106, wherein the cable 142 extends from a position above the work cage 102 through the work cage 102 to a position beneath the work cage 102. Accordingly the work cage 102 can be pulled into a higher position and thus raised from a position beneath the work cage 102. In that case the work cage 102 is guided by lateral guide plates. For fixing to the work cage 102, in particular the railing 118, the lifting device 104 can provide suitable secured hooks 144 which can also generally be referred to as carabiner hooks. Such a secured hook 144 is shown in FIG. 10 and is also shown by way of example in FIG. 11 on an enlarged scale. Moreover FIGS. 8, 10 and 11 also show ladder holders 146, by means of which the pylon ladder 108 including safety rail 112 is fixed to an inside wall of the pylon, the ladder holder 146 also resulting in a spacing between the pylon ladder 108 and the pylon wall in question.

Figure 11:
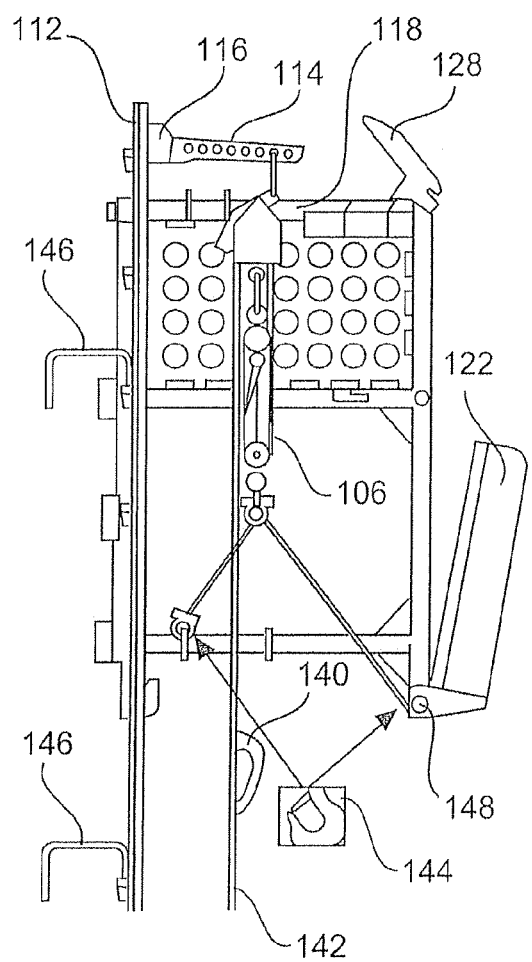
FIG. 11 shows a partly sectional side view of a further embodiment of a work platform apparatus.

FIG. 11 shows a situation similar to that shown in FIG. 10, wherein the block and tackle arrangement 106 is fixed with its secured hooks 144 to other positions of the work cage 102. Accordingly there is no fixing to the railing 118 as shown in FIG. 10, but fixing is made to a pivot axis 148 about which the platform 122 is to be pivoted, and to further holding struts 150 of the work cage 102. Using the pivot axis 148 and the struts 150 for attachment of the secured hooks 144 affords the possibility of pulling the work cage 102 closer to the load arm 114. That is important in particular when the work cage 102 is to be lifted particularly high in the pylon and in particular the uppermost pylon segment which is just to be worked upon. It is precisely when constructing a pylon from various segments that it may be advantageous to pull the work cage 102 as high as possible in the pylon segment to have a better working position when setting a further pylon segment in place. FIG. 11 in that respect shows the work cage 102 in a partly sectional view. More specifically the block and tackle arrangement 106 is arranged in accordance with the situation shown in FIG. 11 in the work cage 102 and can thus only be seen through the sectioned view.

Figure 12:
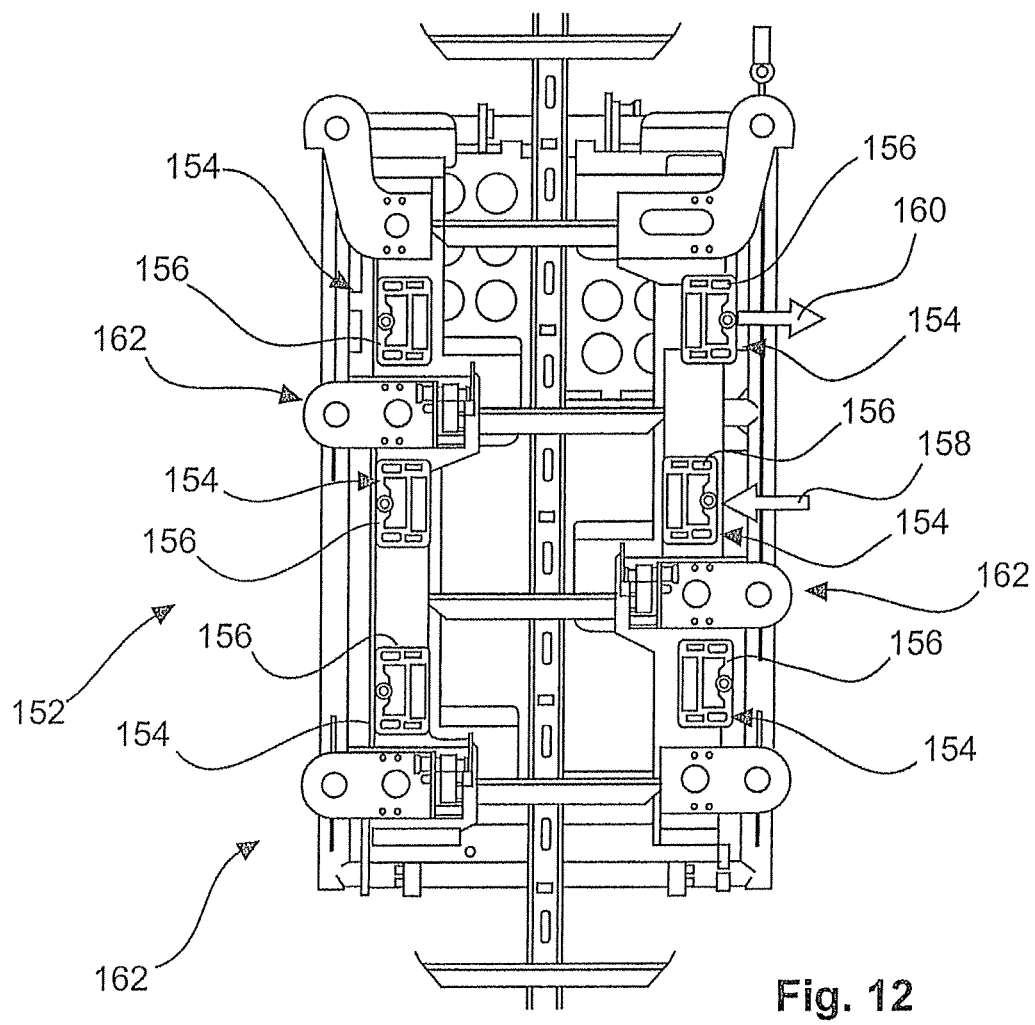
FIG. 12 shows a rear view of a part of a work platform apparatus together with a pylon ladder.

FIG. 12 shows a rear view of the work cage 102, more specifically basically from the view of the pylon wall, to which the pylon ladder 108 is fixed. FIG. 12 thus shows a view of a rear side 152 of the cage, which has a row of fixing means. The work cage is fixed at the rear side 152 thereof by means of six connecting devices or means 154. Each connecting means 154 in this case includes a locking slider 156 with which the connection is made between the work cage 102 and the rear side 152 thereof. The arrow 158 in that case indicates a movement for locking and the arrow 160 indicates a movement for unlocking.

In addition there are provided three support holders 162 which position the work cage in respect of height by being supported on a respective ladder rung 110.

Figure 13:
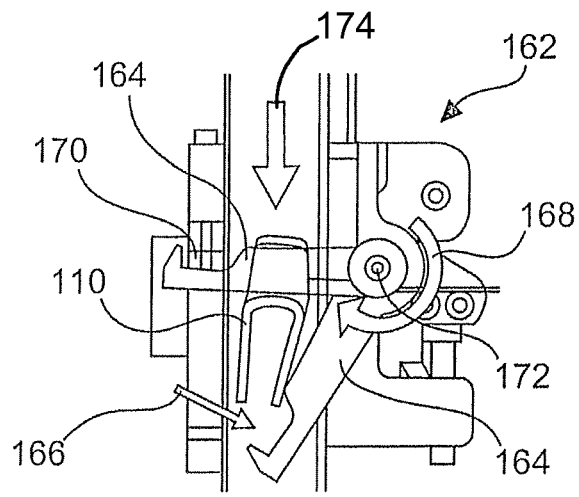
FIG. 13 shows a support device for holding the work platform apparatus to a pylon ladder.

The detail view in FIG. 13 shows a side view of a support holder 162. The support holder has a lever 164 shown in FIG. 13 in two positions, namely in a horizontal rest position and in an inclined, deflecting position. The arrow 166 indicates a deflecting movement into the deflected position. When the work cage is pulled upwardly and in that case the support holder 162 passes a ladder rung 110 then the ladder rung 110 will push the support lever 164 into the deflection movement 160 due to that upward movement of the work cage 102 and therewith the support holder 162. If the upward movement is continued and the ladder rung 110 leaves the contact region with the support lever 164 then the support lever 164 pivots back in the pivotal movement indicated by the arrow 168. In that case the support lever 164 bears against an abutment 170. For that purpose a spring is arranged in the region of the pivot axis 172 of the support lever 164, which however is not shown in the Figures.

If now the work cage 102 is slightly lowered again, the support lever 164 comes to rest on the ladder rung 110 in question and holds the work cage 102. Lowering movement is indicated by the arrow 174.

If the work cage 102 is to be lowered further, then it may be necessary to prevent the support lever 164 from pivoting back, by a suitably provided blocking device. Such a blocking device is present but is not shown in the Figures.

Figure 14:
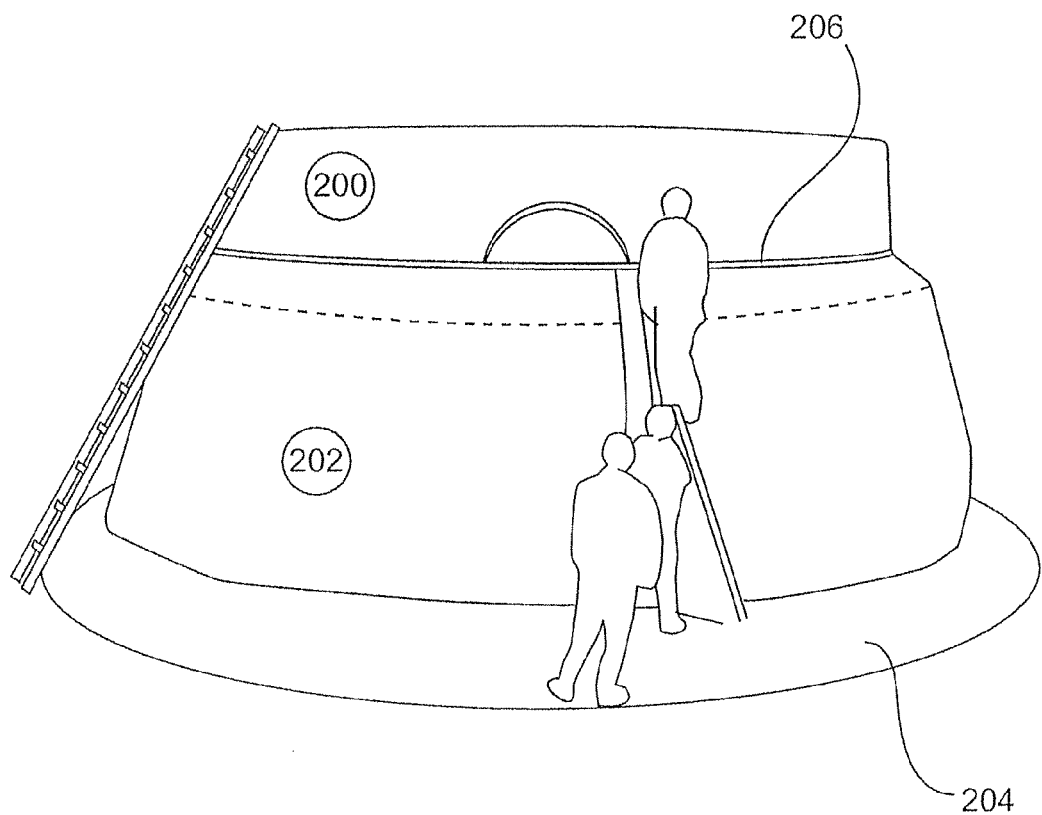
FIG. 14 shows a perspective view of a first pylon segment with a heating apparatus.

FIG. 14 shows a perspective view of a first pylon segment 200 placed on a foundation, around which is shown a heating apparatus having an outer partial cover apparatus 202. That outer partial cover apparatus 202 encloses the junction region which thus cannot be seen between the pylon segment 200 and the foundation 204. In that respect that outer partial cover apparatus 202 provides a protective space around the pylon segment 200 which is readily accessible to adults in respect of height and width. People are diagrammatically indicated to illustrate this.

The outer partial cover apparatus 202 is fixed at an upper peripherally extending rail 206 to the pylon segment 200 and is substantially sealed in relation to the first pylon segment. In that respect such sealing is intended substantially to prevent heat from escaping by convection. In addition a framework is arranged beneath the outer partial cover apparatus 202, which is also connected to the peripherally extending upper rail and which substantially determines the external shape of the outer partial cover apparatus 202.

Figure 15:
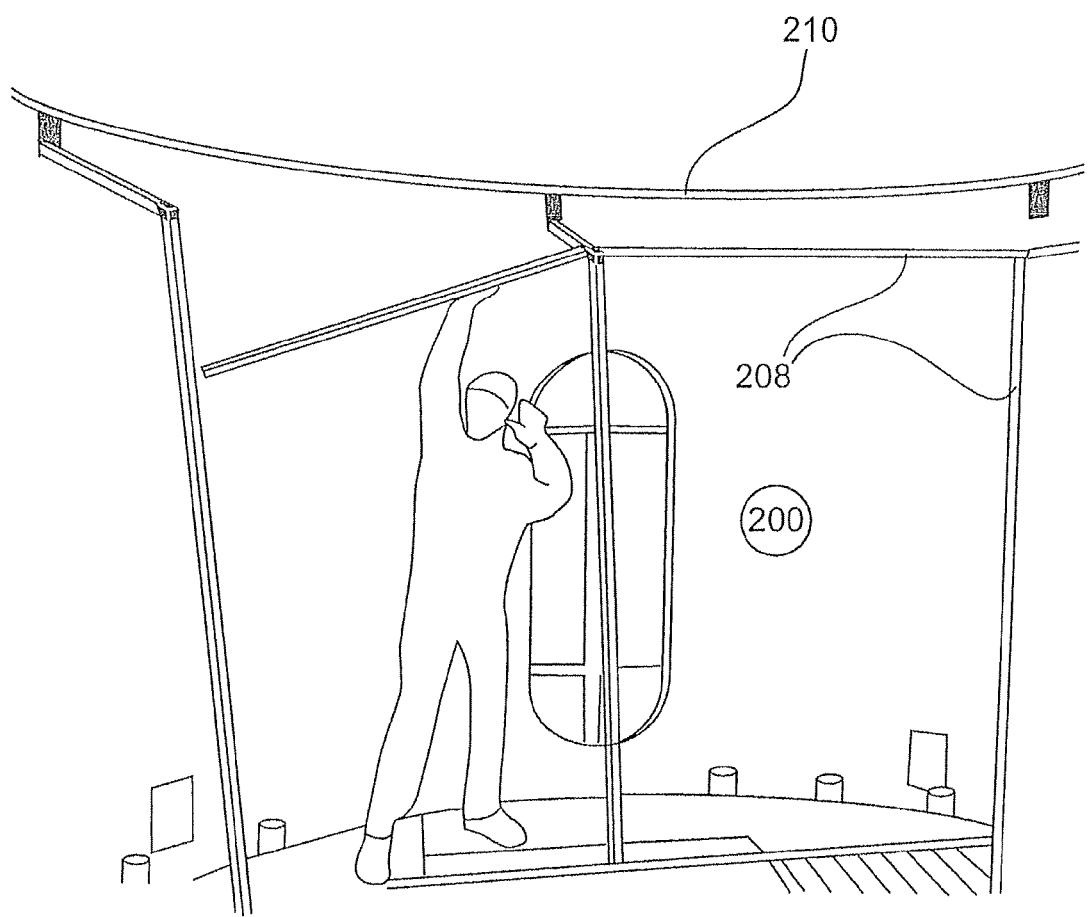
FIG. 15 shows a part of a substructure of a heating apparatus in the interior of a pylon segment.

FIG. 15 shows a part of a carrier framework 208 of an inner partial cover apparatus which is still to be finished. Accordingly FIG. 15 shows the internal space in the pylon segment 200. The inner carrier framework 208 also has a peripherally extending rail, namely an inner peripheral rail 210. The view in FIG. 15 also diagrammatically shows a person to illustrate the size of the carrier framework 208 and thus the inner partial cover apparatus to be provided. In addition the carrier framework 208 which is essentially provided for tautly fastening a cover tarpaulin is connected to the carrier framework 208 to hold it.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lifting apparatus for lifting a first pylon segment of a concrete pylon of a wind power installation in conjunction with a crane, the lifting apparatus comprising:
   at least one fixing means for fixing the first pylon segment to the lifting apparatus, wherein the at least one fixing means includes two holding arms and a pin, wherein the at least one fixing means fixes the first pylon segment to the lifting apparatus by passing the pin through a loop extending from a surface of the first pylon segment;
   and at least one release apparatus configured to cause the at least one fixing means to release a connection between the lifting apparatus and the first pylon segment, wherein the at least one release apparatus has an electric motor to cause the release of the connection between the lifting apparatus and the first pylon segment.

2. The lifting apparatus according to claim 1 wherein the at least one release apparatus is configured to release the connection between the lifting apparatus and the first pylon segment in a substantially residue-free fashion such that a second pylon segment can be arranged on the first pylon segment.

3. The lifting apparatus according to claim 1 wherein the at least one release apparatus is configured to release the connection of a steel cable loop or eye screwed into the first pylon segment by unscrewing the steel cable loop or eye.

4. The lifting apparatus according to claim 1 wherein the at least one fixing means is a plurality of fixing means and the at least one release apparatus is a plurality of release apparatuses, each of the plurality of fixing means being adapted to be connected to the one or more loops of the first pylon segment, wherein the loops are steel, and wherein each of the plurality of fixing means is provided with one of the release apparatuses and is configured to screw the steel loop connected to the respective fixing means out of the first pylon segment.

5. The lifting apparatus according to claim 1 wherein the in of the at least one fixing means is transverse.

6. A method of lifting and lowering a pylon segment of a concrete pylon of a wind power installation, the method comprising:
   hooking at least two fixing means of a lifting apparatus of a crane into respective steel cable loops screwed into a first pylon segment to make a connection between the lifting apparatus and the first pylon segment,
   lifting the first pylon segment and setting the first pylon segment down on a second pylon segment, and
   releasing the connection between the lifting apparatus and the first pylon segment by unscrewing each steel cable loop out of the first pylon segment using a release apparatus of the lifting apparatus, wherein releasing the connection includes using an electric motor of the release apparatus to cause the release of the connection between the lifting apparatus and the first pylon segment.

7. The method according to claim 6 wherein the lifting apparatus is used for lifting and lowering the first pylon segment.

8. The lifting apparatus according to claim 1 wherein the at least one fixing means is a plurality of fixing means, wherein the plurality of fixing means fixes the first pylon segment to the lifting apparatus by passing the pins of the fixing means through the loops extending from the surface of the first pylon segment.

* * * * *